(12) United States Patent
Kim et al.

(10) Patent No.: US 11,971,299 B2
(45) Date of Patent: Apr. 30, 2024

(54) HYPERSPECTRAL IMAGE SENSOR AND OPERATING METHOD THEREOF

(71) Applicants: SAMSUNG ELECTRONICS CO., LTD., Suwon-si (KR); CHUNG ANG University Industry Academic Cooperation Foundation, Seoul (KR)

(72) Inventors: Unjeong Kim, Suwon-si (KR); Jeongsu Han, Hwaseong-si (KR); Hyungbin Son, Seoul (KR); Suyeon Lee, Seoul (KR)

(73) Assignees: SAMSUNG ELECTRONICS CO., LTD., Suwon-si (KR); CHUNG ANG University Industry Academic Cooperation Foundation, Seoul (KR)

( * ) Notice: Subject to any disclaimer, the term of this patent is extended or adjusted under 35 U.S.C. 154(b) by 0 days.

(21) Appl. No.: 17/845,486

(22) Filed: Jun. 21, 2022

(65) Prior Publication Data

US 2023/0126975 A1    Apr. 27, 2023

(30) Foreign Application Priority Data

Oct. 22, 2021    (KR) .................. 10-2021-0141769

(51) Int. Cl.
   *G01J 3/28*    (2006.01)
   *G01J 3/02*    (2006.01)
(52) U.S. Cl.
   CPC ........... *G01J 3/0208* (2013.01); *G01J 3/0229* (2013.01); *G01J 2003/2826* (2013.01)

(58) Field of Classification Search
   CPC ............... G01J 3/0208; G01J 3/0229; G01J 2003/2826; G01J 2003/284; G06T 2207/10036
   See application file for complete search history.

(56) References Cited

U.S. PATENT DOCUMENTS

| 8,988,523 B1 * | 3/2015 | Kim ..................... G06V 10/147 348/340 |
| 10,231,531 B2 * | 3/2019 | Witchell ................ G01N 21/31 |
| 10,337,987 B2 | 7/2019 | Wu et al. |

(Continued)

FOREIGN PATENT DOCUMENTS

| JP | 2019-502418 A | 1/2019 |
| KR | 10-0478676 B1 | 3/2005 |

(Continued)

OTHER PUBLICATIONS

Nicholas Di Giovanni, "Our Monitor Picture Quality Tests Color Accuracy", RTINGS.com, Nov. 21, 2022. (23 pages total).

(Continued)

*Primary Examiner* — Jonathan M Hansen
(74) *Attorney, Agent, or Firm* — Sughrue Mion, PLLC

(57) ABSTRACT

A hyperspectral image sensor includes an optical irradiator configured to irradiate light to a partial region of an object, an optical detector configured to receive detection light generated in the partial region in response to the irradiated light and generate spectrum signals, each of the spectrum signals corresponding to a respective sub-region of a plurality of sub-regions included in the partial region, and a processor configured to generate a hyperspectral image of the partial region based on the spectrum signals.

19 Claims, 15 Drawing Sheets

(56) References Cited

U.S. PATENT DOCUMENTS

| | | | |
|---|---|---|---|
| 10,458,965 B1 | 10/2019 | Iyer et al. | |
| 10,620,447 B2 | 4/2020 | Filhaber | |
| 11,474,016 B1* | 10/2022 | Kent | G01N 15/0211 |
| 2008/0144001 A1 | 6/2008 | Heeg et al. | |
| 2013/0050504 A1 | 2/2013 | Safaee-Rad et al. | |
| 2015/0051498 A1* | 2/2015 | Darty | G01J 3/2803 |
| | | | 600/407 |
| 2018/0242901 A1 | 8/2018 | Barnes et al. | |
| 2019/0154503 A1 | 5/2019 | Yoon et al. | |
| 2019/0373206 A1 | 12/2019 | Kang et al. | |
| 2020/0069111 A1 | 3/2020 | Eiter et al. | |
| 2021/0025755 A1 | 1/2021 | Knobbe et al. | |
| 2021/0035276 A1 | 2/2021 | Ago et al. | |
| 2022/0091087 A1 | 3/2022 | Kim et al. | |
| 2022/0142484 A1 | 5/2022 | DiMaio et al. | |
| 2023/0148951 A1* | 5/2023 | Thatcher | A61B 5/7267 |
| | | | 382/128 |

FOREIGN PATENT DOCUMENTS

| | | | |
|---|---|---|---|
| KR | 10-2014-0054326 A | | 5/2014 |
| KR | 10-2019-0059668 A | | 5/2019 |
| KR | 10-2019-0138560 A | | 12/2019 |
| KR | 10-2021-0034279 A | | 3/2021 |
| WO | 2019/151394 A1 | | 8/2019 |

OTHER PUBLICATIONS

Wang, Meng, "Fluorescence Image Based Food Quality Measurement", Master Thesis, Dept. of Information & Communications Engineering Grad. Sch. of Information Science and Technology, The University of Tokyo, Feb. 2014, XP055889551. (56 pages total).

Communication dated Mar. 8, 2023 by the Korean Intellectual Property Office in counterpart Korean Patent Application No. 10-2021-0141769.

Communication dated Mar. 24, 2023 by the European Patent Office in counterpart European Patent Application No. 22188766.4.

Yoshio Makino, "Non-destructive quality evaluation of fresh food by using AI and optical sensing technology", Journal of the Japan Society for Food Engineering, Sep. 2021, vol. 22, No. 3, 9 pages.

Arisa Torii et al., "Recognition of plating state and quantitative evaluation of the processed surface using hyperspectral data", Transactions of the Japan Society of Mechanical Engineers, Nov. 2020, vol. 86, No. 892, 18 pages, DOI: 10.1299/transjsme.20-00232.

Communication dated Jul. 4, 2023 by the Japanese Patent Office for Japanese Patent Application No. 2022-149916.

Communication issued Jan. 9, 2024 by the Japanese Patent Office in corresponding Japanese Application No. 2022-149916.

* cited by examiner

HYPERSPECTRAL IMAGE SENSOR AND OPERATING METHOD THEREOF

CROSS-REFERENCE TO RELATED APPLICATION

This application is based on and claims priority under 35 U.S.C. § 119 to Korean Patent Application No. 10-2021-0141769, filed on Oct. 22, 2021, in the Korean Intellectual Property Office, the disclosure of which is incorporated by reference herein in its entirety.

BACKGROUND

1. Field

The disclosure relates to a hyperspectral image sensor and an operating method thereof.

2. Description of Related Art

Hyperspectral imaging technology is used to simultaneously measure the optical spectra of each pixel of an image of an object. Hyperspectral imaging technology may be used to measure an optical spectrum of each part of an object in a short time compared to an existing spot spectrum.

The respective pixels of an image include spectral information, and thus, hyperspectral imaging technology may be applied in various ways to measure the properties and characteristics of an object by capturing an image thereof. For example, hyperspectral imaging technology may be applied to agricultural condition analysis, mineral distribution, surface vegetation, pollution level, and so on by imaging the ground by using a drone, a satellite, an aircraft, and so on. Hyperspectral imaging technology has also been considered for other applications in various fields such as food safety, skin/face analysis, and biological tissue analysis.

Hyperspectral imaging technology is used to obtain hyperspectral images by using a point scan method or a line scan method. When the point scan method or the line scan method is used, signals are obtained only in a small region of an object, and thus, a scan speed is inevitably reduced to achieve an expected signal-to-noise ratio (SNR).

SUMMARY

The disclosure provides a hyperspectral image sensor and an operating method thereof. Technical problems of the disclosure are not limited to the technical problems described above, and other technical problems may be inferred from the following embodiments.

Additional aspects will be set forth in part in the description which follows and, in part, will be apparent from the description, or may be learned by practice of embodiments of the disclosure.

In accordance with an aspect of the disclosure, a hyperspectral image sensor includes an optical irradiator configured to irradiate light to a partial region of an object; an optical detector configured to receive detection light generated in the partial region in response to the irradiated light and generate a plurality of spectrum signals, each of the plurality of spectrum signals corresponding to a respective sub-region of a plurality of sub-regions included in the partial region; and a processor configured to generate a hyperspectral image of the partial region based on the plurality of spectrum signals.

The optical detector may include a lens configured to receive the detection light generated in the partial region; a spectrum filter configured to receive the detection light and output a plurality of sub-spectrum filter signals for each sub-region of the plurality of sub-regions, each sub-spectrum filter signal of the plurality of sub-spectrum filter signals corresponding to a different wavelength for the sub-region; and a spectrum signal generator configured to generate a plurality of sub-spectrum signals for each of the plurality of sub-regions based on the plurality of sub-spectrum filter signals.

The processor may be further configured to generate a plurality of sub-hyperspectral images based on the plurality of sub-spectrum signals, each of the plurality of sub-hyperspectral images corresponding to a respective sub-region of the plurality of sub-regions, and the processor may be further configured to merge the plurality of sub-hyperspectral images with each other to generate the hyperspectral image of the partial region.

For each of the plurality of sub-regions, the spectrum filter may output at least three sub-spectrum filter signals, each of the at least three sub-spectrum filter signals corresponding to a different wavelength.

The spectrum filter may be further configured to transmit the plurality of sub-spectrum filter signals to the spectrum signal generator through a plurality of channels.

The optical irradiator may be arranged at a preset distance from the object.

The optical irradiator may include a light source array including a plurality of light sources, and the light source array may be configured to emit a plurality of inspection lights toward the partial region.

The light source array may be further configured to simultaneously emit the plurality of inspection lights toward the partial region.

The optical irradiator may include a transmissive window configured to receive the detection light generated in the partial region.

The transmissive window may be formed in an opening of the optical irradiator.

The optical irradiator may be further configured to emit light toward a second partial region of the object, different from the partial region, after emitting the light to the partial region.

The processor may be further configured to generate a full hyperspectral image of the object based on the hyperspectral image generated in the partial region and a second hyperspectral image generated in the second partial region.

The optical irradiator may be further configured to emit light toward a second partial region of the object, the second partial region at least partially overlapping the partial region.

The processor may be further configured to generate a full hyperspectral image of the object by removing an overlapping hyperspectral image of an overlapping region in which the second partial region at least partially overlaps the partial region.

In accordance with an aspect of the disclosure, an operating method of a hyperspectral image sensor includes irradiating light to a partial region of an object; receiving detection light generated in the partial region in response to the irradiated light; generating a plurality of spectrum signals, each of the plurality of spectrum signals corresponding to a respective sub-region of a plurality of sub-regions included in the partial region; and generating a hyperspectral image of the partial region based on the plurality of spectrum signals.

In the irradiating of the light, a plurality of inspection lights may be simultaneously irradiated to the partial region.

The generating of the plurality of spectrum signals may include outputting a plurality of sub-spectrum filter signals for each sub-region of the plurality of sub-regions, each sub-spectrum filter signal of the plurality of sub-spectrum filter signals corresponding to a different wavelength for the sub-region; and generating a plurality of sub-spectrum signals for each of the plurality of sub-regions based on the plurality of sub-spectrum filter signals.

The generating of the hyperspectral image may include generating a plurality of sub-hyperspectral images based on the plurality of sub-spectrum signals, each of the plurality of sub-hyperspectral images corresponding to a respective sub-region of the plurality of sub-regions; and merging the plurality of sub-hyperspectral images with each other to generate the hyperspectral image of the partial region.

The operating may further include irradiating light to a second partial region of the object different from the partial region; and generating a full hyperspectral image of the object based on the hyperspectral image generated in the partial region and a second hyperspectral image generated in the second partial region.

The operating method may further include irradiating light to a second partial region of the object, the second partial region at least partially overlapping the partial region; and generating a full hyperspectral image of the object by removing an overlapping hyperspectral image of an overlapping region in which the second partial region at least partially overlaps the partial region.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
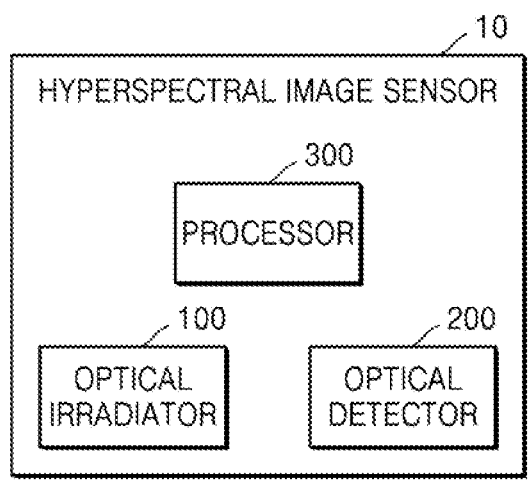
FIG. 1 is a block diagram of a hyperspectral image sensor according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Some embodiments of the disclosure may be represented by functional block configurations and various processing operations. Some or all of the functional block configurations may be implemented by various pieces of hardware and/or software for performing certain functions. For example, functional blocks of the present disclosure may be implemented by one or more microprocessors or may be implemented by circuit configurations for a certain function. In addition, for example, the functional blocks of the present disclosure may be implemented in various programming or scripting languages. The functional blocks may be implemented by using an algorithm executed by one or more processors. In addition, the present disclosure may adopt the related art for an electronic configuration, signal processing, data processing and/or so on. The terms "mechanism", "element", "means", "configuration", and so on may be widely used and are not limited to mechanical and physical configurations.

In addition, connection lines or connection members between components illustrated in the drawing are examples in which functional connections and/or physical or circuit connections are illustrated. In an actual device, connections between components may be represented by a variety of functional connections, physical connections, or circuit connections that may be replaced or added.

FIG. 1 is a block diagram of a hyperspectral image sensor according to an embodiment.

Referring to FIG. 1, a hyperspectral image sensor 10 may include an optical irradiator 100, an optical detector 200, and a processor 300.

Figure 2:
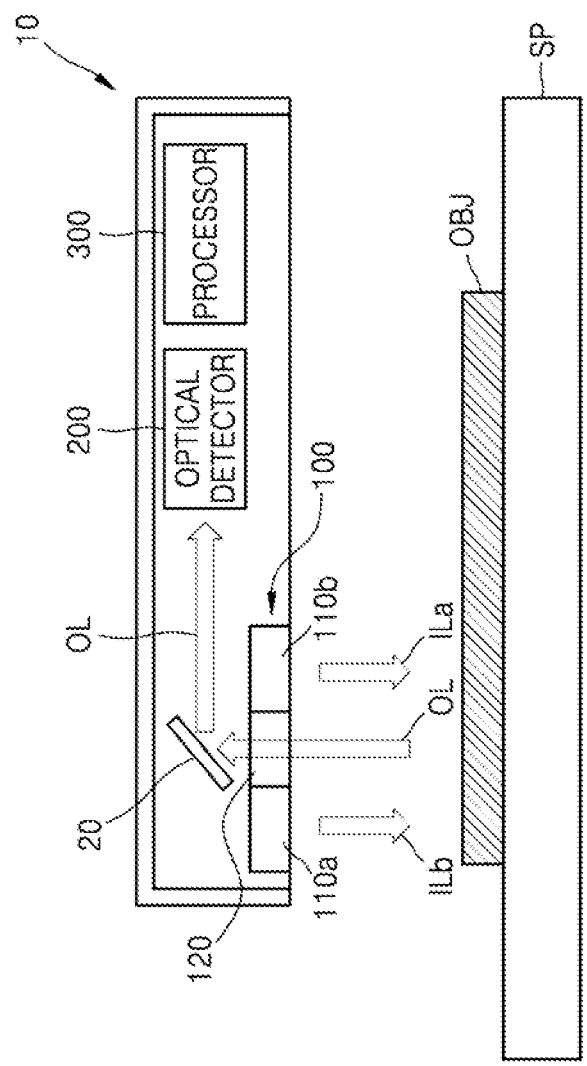
FIG. 2 is a conceptual view of a hyperspectral image sensor according to an embodiment.

The optical irradiator 100 may irradiate an object OBJ illustrated in FIG. 2 with light. The optical irradiator 100 may irradiate light to an inspection region that is a partial region of the object OBJ. The optical irradiator 100 may irradiate light while changing an inspection region of the object OBJ.

The optical irradiator 100 may be adjacent to the object OBJ. The optical irradiator 100 may be arranged at a preset distance from the object (OBJ). For example, a distance between the light irradiator 100 and the object OBJ may be set to be 10 cm or less but is not limited thereto. As described below, the processor 300 generates a hyperspectral image of the object OBJ by using an area scan method, not a line scan method or a point scan method, and thus, the optical irradiator 100 may be adjacent to the object OBJ.

A wavelength of the light emitted by the light irradiator 100 may be set to be different depending on the type of the object OBJ. For example, when the object OBJ is meat, the light irradiator 100 may emit light with a wavelength of about 335 nm to about 370 nm. For this purpose, the optical irradiator 100 may include a light emitting diode (LED).

The optical detector 200 may receive detection light emitted from the object OBJ. In an embodiment, the detection light may indicate the light which is emitted by the optical irradiator 100, reflected by the object OBJ, and then received by the optical detector 200. In an embodiment, the detection light may indicate the light which is emitted by the optical irradiator 100, scattered by the object OBJ, and then received by the optical detector 200. In an embodiment, the detection light may also indicate fluorescence emitted from the object OBJ when light emitted by the optical irradiator 100 is absorbed into the object OBJ. In an embodiment, the detection light may also indicate Raman spectrum. However, the detection light of the disclosure is not limited thereto and may indicate all of the light detected by the optical detector 200 as a result of light irradiation.

The optical detector 200 may generate a spectrum signal based on the detection light. The optical detector 200 may generate a spectrum signal by splitting the detection light.

The optical detector 200 may receive detection light generated in the inspection region and generate spectrum signals for a plurality of sub-inspection regions (e.g., sub-regions) included in the inspection region.

The processor 300 may receive a spectrum signal from the optical detector 200. The processor 300 may generate a hyperspectral image of the object OBJ based on the spectrum signal. The hyperspectral image may indicate a combination of spectrum distribution for each position of the object OBJ.

Figure 3:
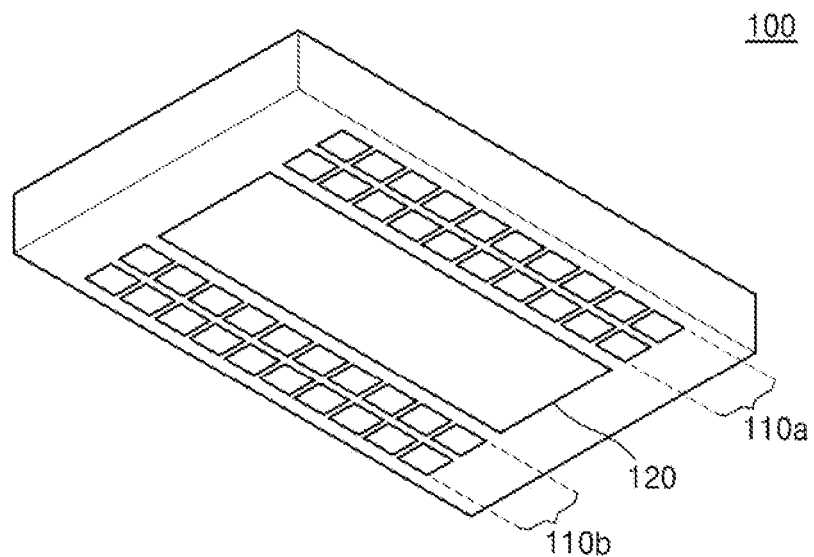
FIG. 3 is a conceptual view of an optical irradiator according to an embodiment.
Figure 4:
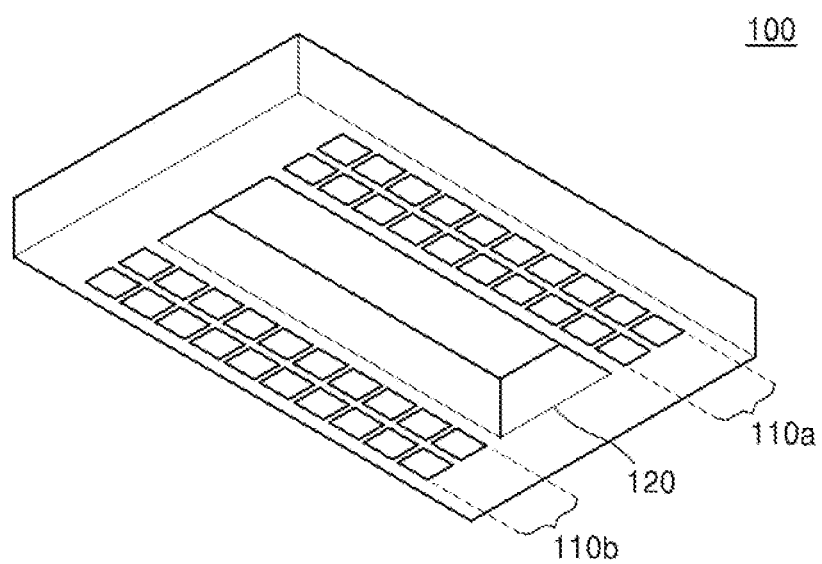
FIG. 4 is a conceptual view of an optical irradiator according to an embodiment.
Figure 5:
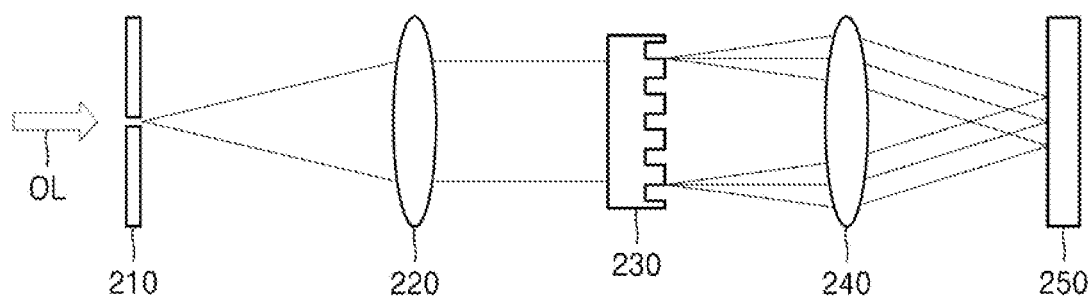
FIG. 5 is a conceptual view of an optical detector according to an embodiment.
Figure 6:
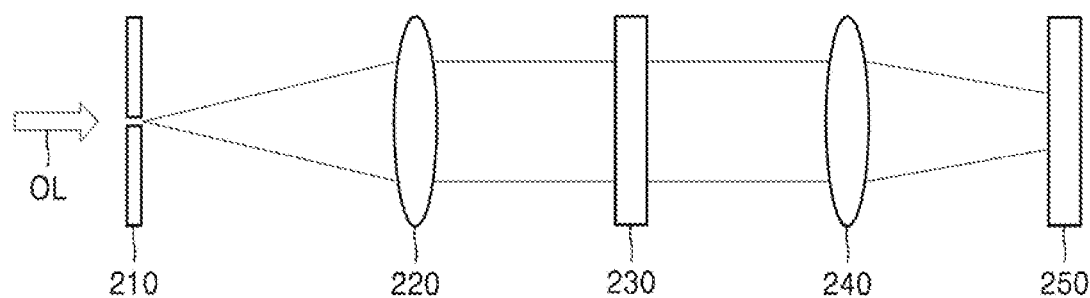
FIG. 6 is a conceptual view of an optical detector according to an embodiment.

FIG. 2 is a conceptual view of a hyperspectral image sensor according to an embodiment, FIG. 3 is a conceptual view of an optical irradiator according to an embodiment, FIG. 4 is a conceptual view of an optical irradiator according to an embodiment, FIG. 5 is a conceptual view of an optical detector according to an embodiment, and FIG. 6 is a conceptual view of an optical detector according to an embodiment.

Referring to FIG. 2, the object OBJ may be on a support SP. The object OBJ may indicate anything which may require a hyperspectral image such as clothing, a heat exchanger, and meat.

The optical irradiator 100 may face the object OBJ. The optical irradiator 100 may irradiate the object OBJ with light. In this case, light emitted from the optical irradiator 100 may be referred to as inspection light ILa and ILb (when there is no need to distinguish ILa and ILb below, ILa and ILb are referred to as IL).

Referring to FIGS. 3 and 4, the optical irradiator 100 may include light source arrays 110a and 110b (hereinafter, when there is no need to distinguish 110a and 110b below, 110a and 110b are referred to as 110). The light source array 110 may emit light toward the inspection region which is a partial region of the object OBJ.

The light source array 110 may include a first light source array 110a, a second light source array 110b, and a transmissive window 120. The first light source array 110a and the second light source array 110b may be separated from each other with the transmissive window 120 therebetween. The first light source array 110a and the second light source array 110b may each include a plurality of light sources arranged in one direction. For example, the light sources may include LEDs.

The plurality of light sources may be arranged along the transmissive window 120. FIG. 3 illustrates that the first light source array 110a and the second light source array 110b each include two lines of but are not limited thereto.

The transmissive window 120 may receive detection light OL generated by the object OBJ by irradiation of light.

The transmissive window 120 may be formed of a transparent material as illustrated in FIG. 3. For example, the transmissive window 120 may be formed of transparent plastic or glass. The transmissive window 120 may be formed of a material with high durability to a low temperature. The detection light OL may be provided to the optical detector 200 through the transmissive window 120.

According to an embodiment, the transmissive window 120 may be formed as an opening as illustrated in FIG. 4. The detection light OL may be provided to the optical detector 200 through the opening.

Referring to FIG. 2, the detection light OL may be provided to the optical detector 200 by an optical path adjustment element 20. According to an embodiment, the optical detector 200 may include a hyperspectral camera.

Referring to FIGS. 5 to 6, the optical detector 200 may include a lens 220, a spectrum filter 230, and a spectrum signal generator 250. According to an embodiment, the optical detector 200 may further include a slit element 210 and a condensing lens 240.

The slit element 210 may be used to extract parts required for testing from the detection light OL. The detection light OL may be radiated from the slit element 210.

The lens 220 may receive the detection light OL passing through the slit element 210. The lens 220 may adjust the detection light OL to be parallel or convergent. For example, the lens 220 may include a collimating lens. The collimating lens may include a convex lens.

The spectrum filter 230 may split the detection light OL provided from the lens 220. The spectrum filter 230 may be mechanically formed as illustrated in FIG. 5 or may be electrically formed as illustrated in FIG. 6. For example, referring to FIG. 5, the spectrum filter 230 may include a prism.

Light of different wavelength bands may pass through the spectrum filter 230. The spectrum filter 230 may filter the detection light OL provided from the lens 220 to have spatially different wavelengths. In other words, the detection light OL passing through different regions of the spectrum filter 230 may have different wavelengths. The detection light OL split by the spectrum filter 230 may be provided to the spectrum signal generator 250 through the condensing lens 240. For example, the condensing lens 240 may include a convex lens.

The spectrum signal generator 250 may generate a spectrum signal from detection light OL. The spectrum signal generator 250 may provide the spectrum signal to the processor 300.

The processor 300 may generate a hyperspectral image of the object OBJ based on the spectrum signal. A hyperspectral image of the object OBJ may be generated by merging spectral distribution information for each position of the object OBJ. In other words, the hyperspectral image of the object OBJ may be a set of spectral distributions for each position of the object OBJ. For example, the processor 300 may generate a hyperspectral image of the object OBJ by removing offsets from a plurality of sub-hyperspectral images and summing the sub-hyperspectral images from which the offsets are removed. However, a method of generating a hyperspectral image of the disclosure is not limited thereto, and a method of generating a known hyperspectral image may be used therefor.

Figure 7:
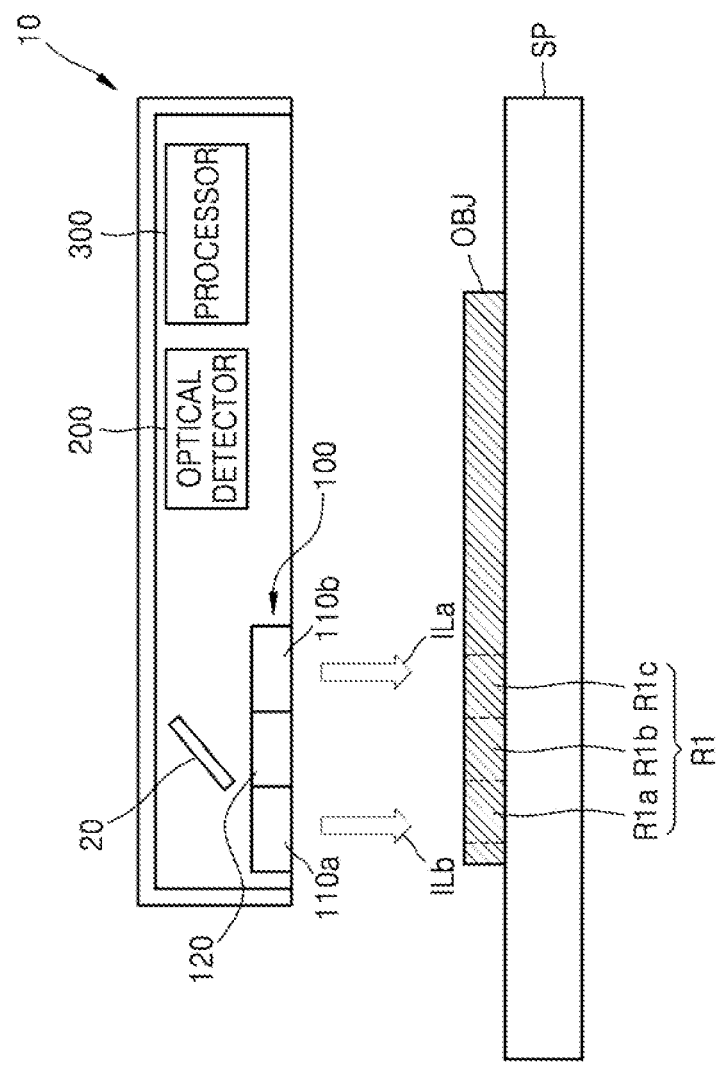
FIGS. 7 and 8 are reference views illustrating a method of generating a hyperspectral image according to an embodiment.
Figure 8:
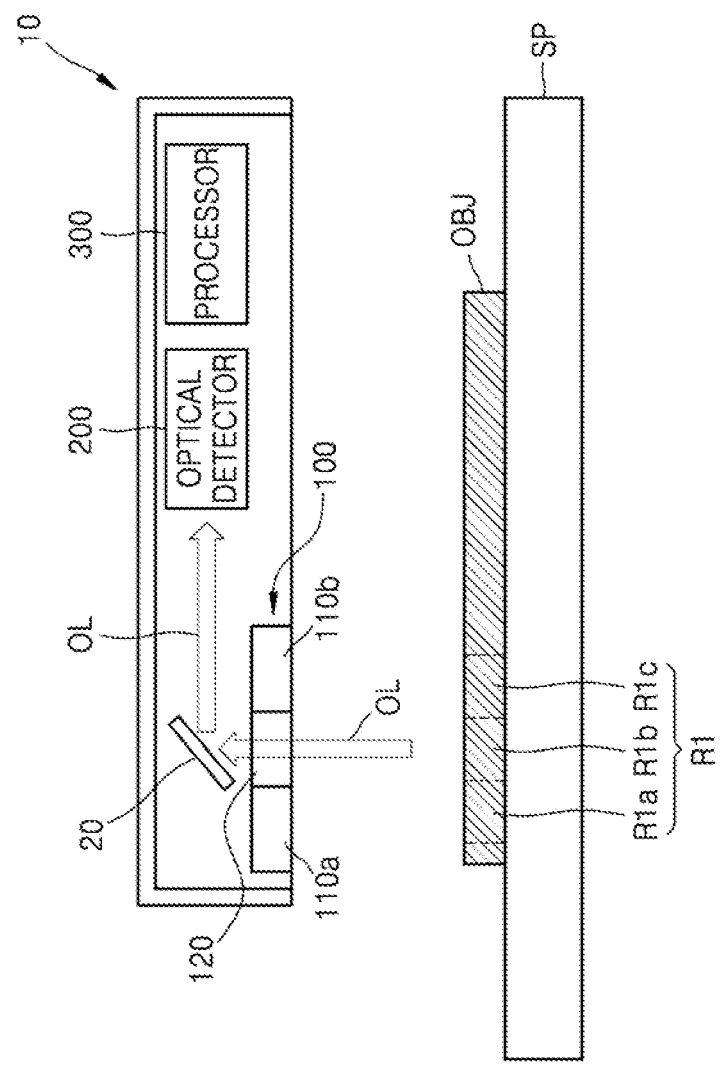

FIGS. 7 and 8 are reference views illustrating a method of generating a hyperspectral image according to an embodiment.

Referring to FIGS. 7 and 8, the optical irradiator 100 may irradiate the light ILa and ILb to the inspection region R1 which is a partial region of the object OBJ. In order to distinguish the inspection region R1 of FIGS. 7 and 8 from an inspection region R2 of FIGS. 11 and 12, the inspection region R1 of FIGS. 7 and 8 may be referred to as a first inspection region, and the inspection region R2 of FIGS. 11 and 12 may be referred to as a second inspection region R2. Alternatively, the inspection region R1 of FIGS. 7 and 8 may be referred to as a previous inspection region R1, and the inspection region R2 of FIGS. 11 and 12 may be referred to as a current inspection region R2.

The inspection region R1 may include a plurality of sub-inspection regions R1a, R1b, and R1c (hereinafter, when there is no need to distinguish R1a, R1b, and R1c, R1a, R1b, and R1c are collectively referred to as R1a).

Referring to FIG. 7, the optical irradiator 100 may include a plurality of light sources, and a plurality of inspection lights ILa and ILb may be simultaneously irradiated to the inspection region R1. Therefore, lights may simultaneously reach the plurality of sub-inspection regions R1a.

Referring to FIG. 8, the optical detector 200 may receive the detection light OL generated by the object OBJ in response to the irradiated light. For example, the detection light OL may indicate reflected light, scattering light, fluorescence, Raman spectrum, and so on. However, the detection light OL of the disclosure is not limited thereto and may indicate some or all of the light detected by the optical detector 200 as a result of irradiation of the light.

The detection light OL may be provided again to the hyperspectral image sensor 10 by passing through the transmissive window 120. The optical path adjustment element 20 may adjust a path of the detection light OL and provide the detection light OL to the optical detector 200.

The optical detector 200 may include a spectrum filter 230 and a spectrum signal generator 250 as shown, e.g., in FIGS. 5 and 6. The spectrum filter 230 may receive detection light OL. The optical detector 200 may output sub-spectrum filter signals for each wavelength for a plurality of sub-inspection regions R1a. The spectrum filter 230 may output at least three sub-spectrum filter signals of different wavelengths. For example, the spectrum filter 230 may output red, green, and blue sub-spectrum filter signals.

The spectrum filter 230 may transmit the sub-spectrum filter signals to the spectrum signal generator 250 through a plurality of channels. For example, when the spectrum filter 230 splits red, green, and blue wavelengths, the spectrum filter 230 may transmit the sub-spectrum filter signals to the spectrum signal generator 250 through three channels.

The spectrum signal generator 250 may generate sub-spectrum signals for each of a plurality of sub-inspection regions R1a based on the sub-spectrum filter signals.

The spectrum signal generator 250 may include sets of a plurality of pixels. In an embodiment, the sets of the plurality of pixels may correspond to the plurality of different sub-inspection regions R1a in the inspection region R1. The sets of the plurality of pixels may each include sets of a plurality of sub-pixels respectively corresponding to a plurality of wavelength bands. For example, a first set of sub-pixels may measure light of a first wavelength band, a second set of sub-pixels may measure light of a second wavelength band different from the first wavelength band, and a third set of sub-pixels may measure light of a third wavelength band different from the first wavelength band and the second wavelength band. Accordingly, the spectrum signal generator 250 may generate sub-spectrum signals for each of the sub-inspection regions R1a.

The spectrum signal generator 250 may provide the sub-spectrum signals to the processor 300.

The processor 300 may generate sub-hyperspectral images for each of the plurality of sub-inspection regions R1a based on the sub-spectrum signals. The sub-hyperspectral image may include spectrum distribution information of the detection light OL.

The processor 300 may merge sub-hyperspectral images to generate a hyperspectral image of the inspection region R1.

Figure 9:
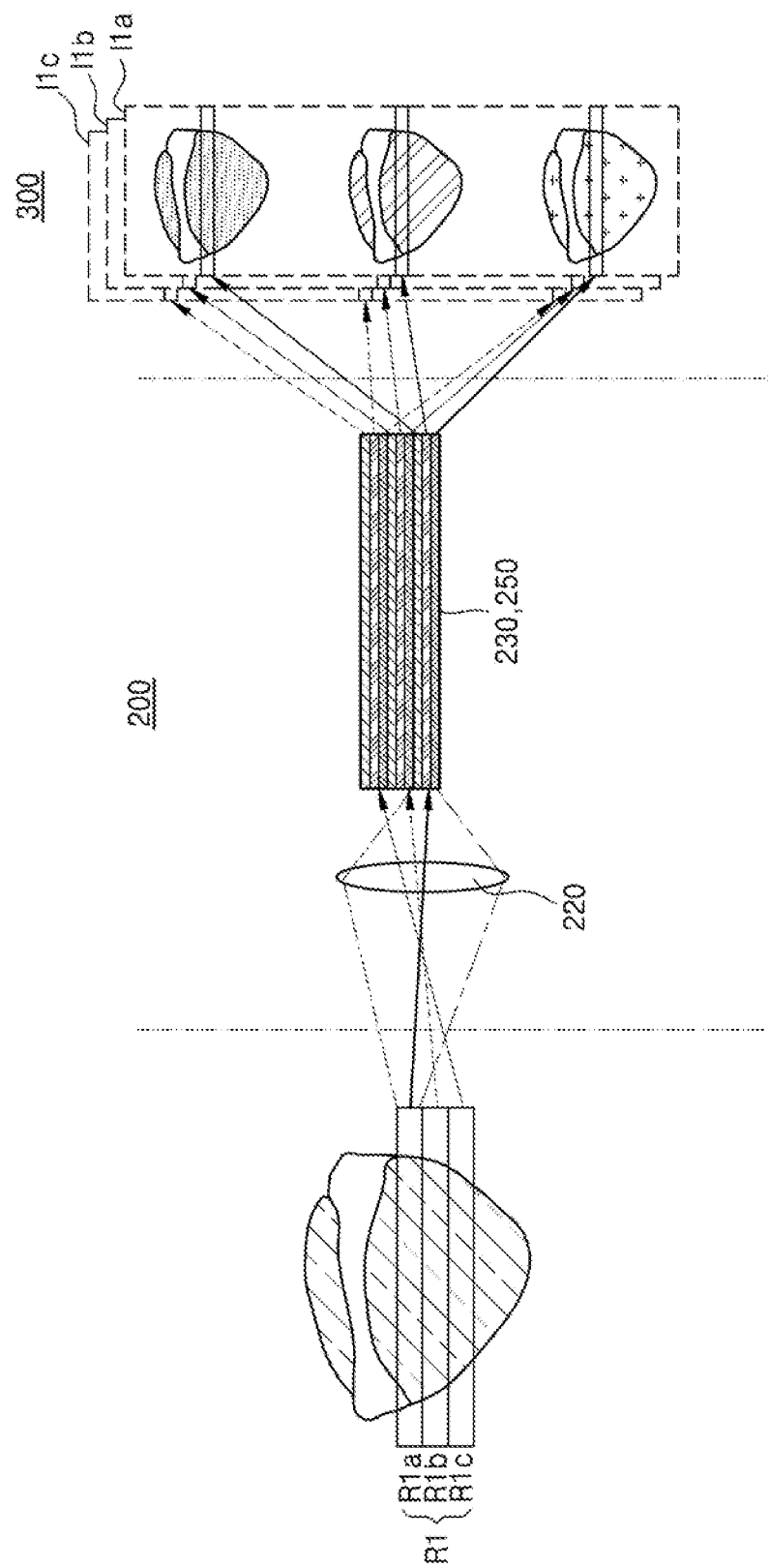
FIG. 9 is a reference view for FIGS. 7 to 8.

FIG. 9 is a reference view for describing FIGS. 7 and 8.

Referring to FIG. 9, the inspection region R1 may include a first sub-inspection region R1a, a second sub-inspection region R1b, and a third sub-inspection region R1c.

The optical detector 200 may include a lens 220, a spectrum filter 230, and a spectrum signal generator 250. The optical detector 200 may simultaneously receive the detection light OL generated in the inspection region R1 of the object OBJ.

The optical detector 200 may split the detection light OL based on the number of preset wavelength bands. FIG. 9 illustrates that the detection light (OL) is split into three wavelength bands, but the number of wavelength bands may be increased or reduced according to an embodiment.

The optical detector 200 may split the detection light generated in each of the plurality of sub-inspection regions R1a, R1b, and R1c into three wavelength bands. The optical detector 200 may split the detection light generated in the first sub-inspection region R1a into three wavelength bands and output a first sub-spectrum filter signal. The optical detector 200 may split the detection light generated in the second sub-inspection region R1b into three wavelength bands and output a second sub-spectrum filter signal. The optical detector 200 may split the detection light generated in the third sub-inspection region R1c into three wavelength bands and output a third sub-spectrum filter signal.

The optical detector 200 may generate sub-spectrum signals for the plurality of sub-inspection regions R1a, R1b, and R1c based on the sub-spectrum filer signals. The optical detector 200 may generate a first sub-spectrum signal based on the first sub-spectrum filer signal. The optical detector 200 may generate a second sub-spectrum signal based on the second sub-spectrum filter signal. The optical detector 200 may generate a third sub-spectrum signal based on the third sub-spectrum filter signal. The optical detector 200 may provide the first to third sub-spectrum signals to the processor 300.

The processor 300 may generate sub-hyperspectral images for each of the plurality of sub-inspection regions based on the sub-spectrum signals. The processor 300 may generate a first sub-hyperspectral image I1a for the first sub-inspection region R1a based on the first sub-spectrum signal. The processor 300 may generate a second sub-hyperspectral image I1b for the second sub-inspection region R1b based on the second sub-spectrum signal. The processor 300 may generate a third sub-hyperspectral image I1c for the third sub-inspection region R1c based on the third sub-spectrum signal.

The processor 300 may merge the first to third hyperspectral images I1a to I1c to generate a hyperspectral image on the inspection region R1.

When the hyperspectral image sensor 10 of the disclosure merges the hyperspectral images, the number of channels through which light of the same wavelength passes is large, and thus, the same position of the object OBJ is measured n times to increase a signal S n times. In addition, there is no correlation between N hyperspectral images, and thus, noise N is summed according to a root mean square equation and is proportional to $(n)^{1/2}$. Therefore, a signal noise ratio (SNR) is increased to $(n)^{1/2}$ in the same merge time and the same scan step condition.

Figure 10:
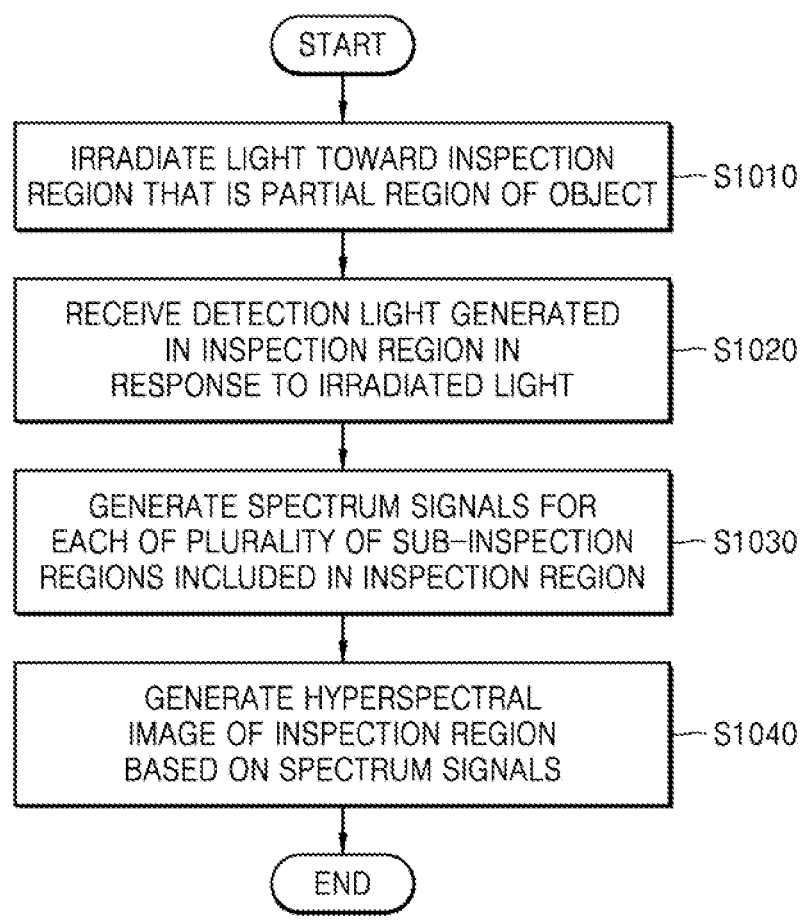
FIG. 10 is a flowchart illustrating a method of generating a hyperspectral image according to an embodiment.

FIG. 10 is a flowchart illustrating a method of generating a hyperspectral image according to an embodiment.

Referring to FIG. 10, in operation S1010, the optical irradiator 100 may irradiate light to the inspection region R1 which is a partial region of the object OBJ.

The optical irradiator 100 may include a light source array including a plurality of light sources, and the light source array may simultaneously emit a plurality of inspection lights toward the inspection region R1.

In operation S1020, the optical detector 200 may receive the detection light OL generated in the inspection region R1 by the irradiation of light.

The optical detector 200 may simultaneously receive the detection light OL generated in the inspection region R1 of the object OBJ.

In operation S1030, the optical detector 200 may generate spectrum signals for each of a plurality of sub-inspection regions R1a included in the inspection region R1.

The optical detector 200 may output sub-spectrum filter signals for each wavelength for a plurality of sub-inspection regions R1a. For example, three wavelength bands may be set, and the optical detector 200 may output sub-spectrum filter signals corresponding to red, green, and blue wavelength bands for each of the sub-inspection regions R1a. The optical detector 200 may generate sub-spectrum signals for each of the plurality of sub-inspection regions R1a based on the sub-spectrum filter signals.

In operation S1040, the processor 300 may generate a hyperspectral image of the inspection region R1 based on the spectrum signals.

The processor 300 may generate sub-hyperspectral images for each of the plurality of sub-inspection regions R1a based on the sub-spectrum signals. The processor 300 may merge sub-hyperspectral images to generate a hyperspectral image of the inspection region R1.

The hyperspectral image sensor 10 of the disclosure may generate a hyperspectral image of an area of the object OBJ, and thus, high-speed scan may be performed compared to a line scan method or a point scan method. In addition, according to the hyperspectral image sensor 10 of the disclosure, a pixel area of the spectrum signal generator 250 increases, and merging time of the hyperspectral image is reduced, and thus, the object OBJ may be scanned at high speed while maintaining a scan step and resolution. In addition, according to the hyperspectral image sensor 10 of the disclosure, a scan step and resolution is reduced, and thus, the object OBJ may be scanned at high speed.

Figure 11:
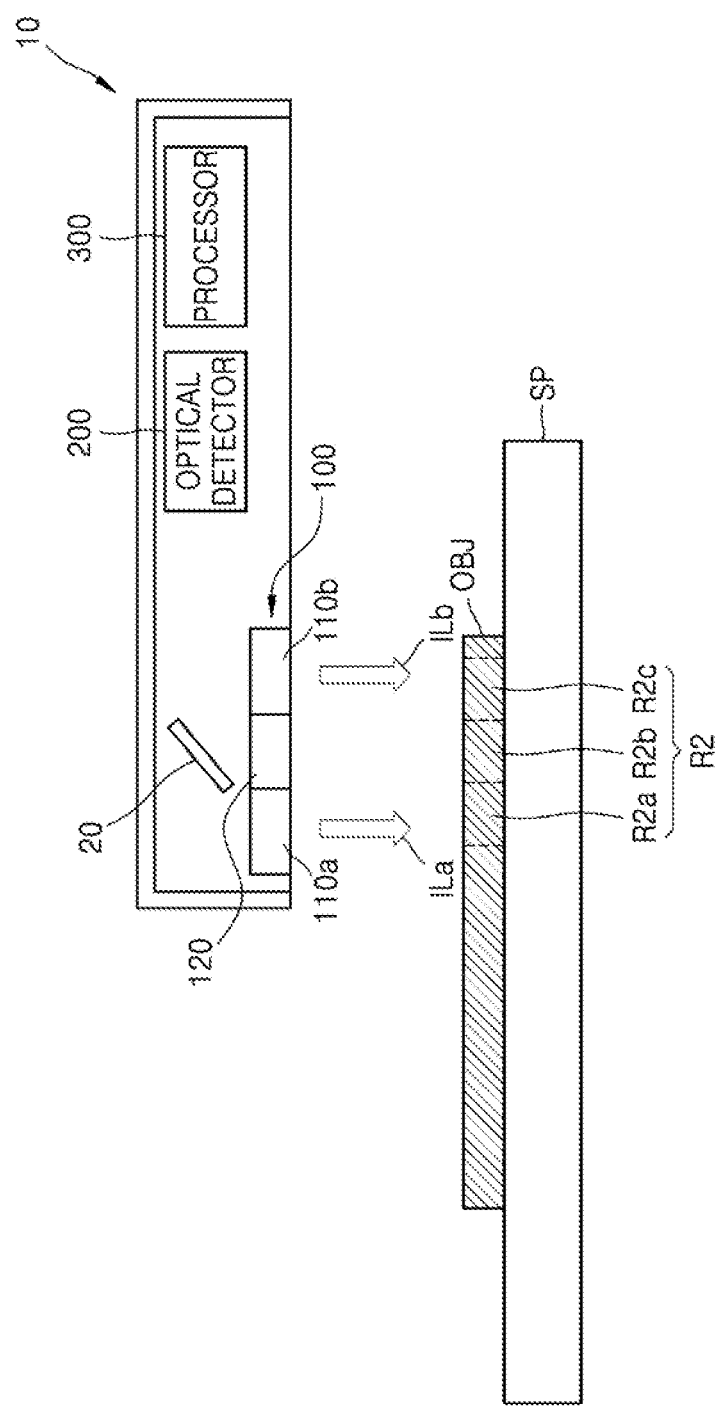
FIGS. 11 and 12 are reference views illustrating a method of generating a hyperspectral image according to an embodiment.
Figure 12:
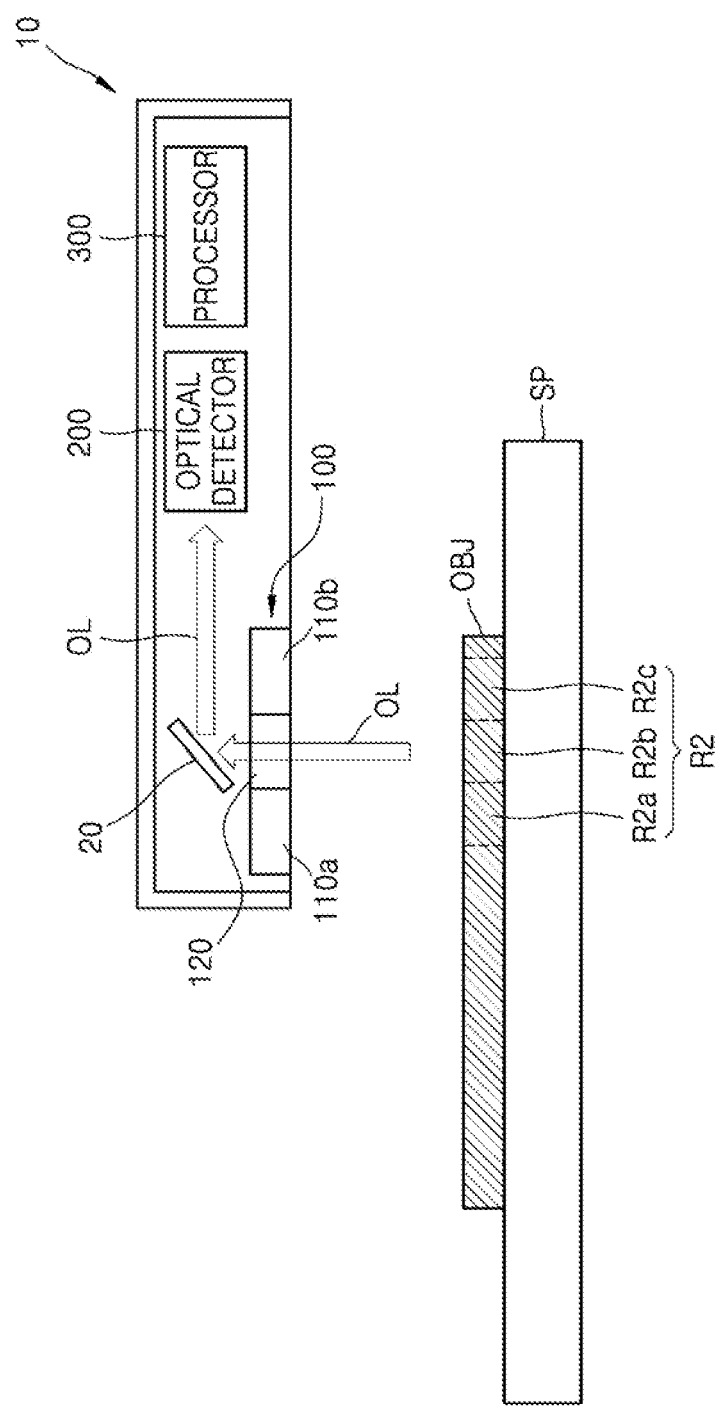

FIGS. 11 and 12 are reference views illustrating a method of generating a hyperspectral image according to an embodiment.

Referring to FIGS. 11 and 12, the optical irradiator 100 may be moved to a position facing the second inspection region R2 from a position facing the first inspection region R1. The first inspection region R1 may be referred to as a previous inspection region, and the second inspection region R2 may be referred to as a current inspection region. The second inspection region R2 may be different from the first inspection region R1. According to an embodiment, at least a part of the second inspection region R2 may overlap the first inspection region R1.

In addition, FIGS. 11 and 12 illustrate that the hyperspectral image sensor 10 is totally moved, and the hyperspectral image sensor 10 may further include an adjustment mechanism for adjusting at least one of a position and an angle of the optical irradiator 100, and the optical irradiator 100 may be moved according to the control of the adjustment mechanism.

The second inspection region R2 (e.g., the second partial region of the object OBJ) may include a plurality of sub-inspection regions R2a, R2b, and R2c (hereinafter, when there is no need to distinguish R2a, R2b, and R2c, R2a, R2b, and R2c are collectively referred to as R2a).

Referring to FIG. 11, the optical irradiator 100 may irradiate the inspection light ILa and ILb to the subject OBJ at a position facing the second inspection region R2. The optical irradiator 100 may include a plurality of light sources and simultaneously irradiate a plurality of inspection lights ILa and ILb to the second inspection region R2. Therefore, lights may simultaneously reach the plurality of sub-inspection regions R2a.

Referring to FIG. 8, the optical detector 200 may receive the detection light OL generated by the object OBJ in response to the irradiated light. The optical detector 200 may output sub-spectrum filter signals for each wavelength for each of the plurality of sub-inspection regions R1a based on the detection light OL. The optical detector 200 may generate sub-spectrum signals for each of the plurality of sub-inspection regions R1a based on the sub-spectrum filter signals. A method of generating a sub-spectrum signal in FIG. 12 may be substantially the same as the method of generating the sub-spectrum signal in FIGS. 7 and 8.

The processor 300 may generate sub-hyperspectral images for each of the plurality of sub-inspection regions R2a based on the sub-spectrum signals. The processor 300 may merge the sub-hyperspectral images to generate a hyperspectral image of the second inspection region R2. The hyperspectral image generated in the first inspection region R1 may be referred to as a first hyperspectral image, and a hyperspectral image generated in the second inspection region R2 may be referred to as a second hyperspectral image.

The processor 300 may merge the first hyperspectral image and the second hyperspectral image to generate a full hyperspectral image of the object OBJ.

Figure 13:
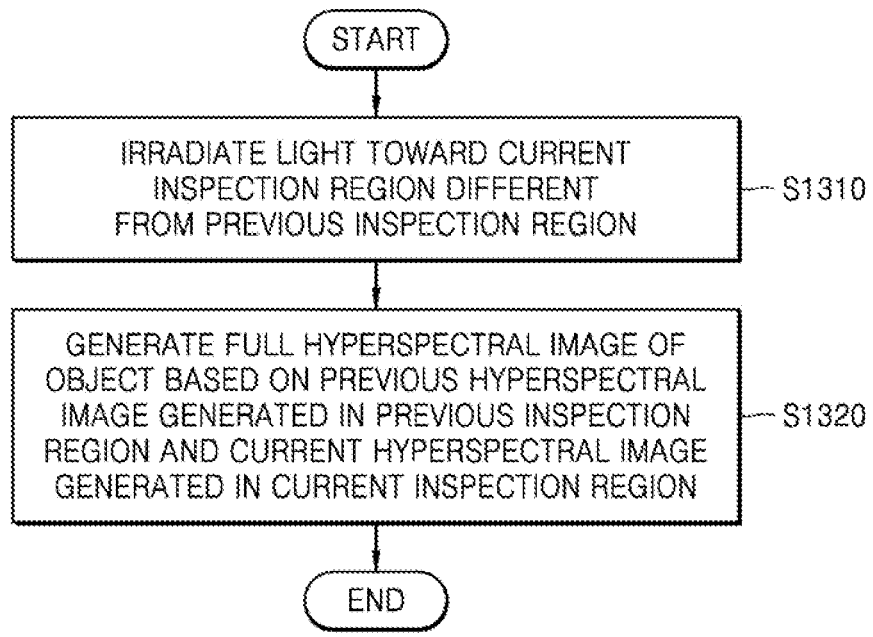
FIG. 13 is a flowchart illustrating a method of generating a hyperspectral image according to an embodiment.

FIG. 13 is a flowchart illustrating a method of generating the full hyperspectral image according to an embodiment.

Referring to FIG. 13, in operation S1310, the optical irradiator 100 may irradiate light to the current inspection region R2 different from the previous inspection region R1. The previous inspection region R1 may not overlap the current inspection region R2.

In operation S1320, the optical irradiator 100 may generate a full hyperspectral image of the object OBJ based on the previous hyperspectral image generated in the previous inspection region R1 and the current hyperspectral image generated in the current inspection region R2.

When the previous inspection region R1 does not overlap the current inspection region R2, the object OBJ may be scanned at high speed, and the hyperspectral image may be merged at high speed.

Figure 14:
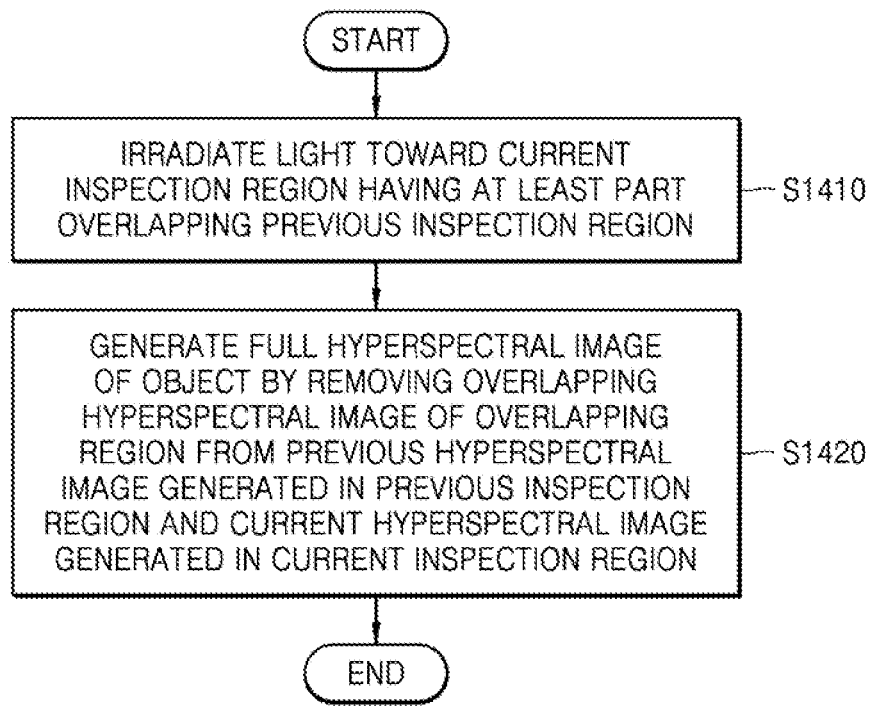
FIG. 14 is a flowchart illustrating a method of generating a full hyperspectral image according to an embodiment.

FIG. 14 is a flowchart illustrating a method of generating a full hyperspectral image according to an embodiment.

Referring to FIG. 14, in operation S1410, the optical irradiator 100 may irradiate light to the current inspection region R2 having at least a part overlapping the previous inspection region R1.

In operation S1420, the processor 300 may generate a full hyperspectral image of the object OBJ by removing an overlapping hyperspectral image of the overlapping region from a previous hyperspectral image generated in the previous inspection region R1 and a current hyperspectral image generated in the current inspection region R2.

In an embodiment, when merging the previous hyperspectral image with the current hyperspectral image, the processor 300 may remove a hyperspectral image of the overlapping region from either the previous hyperspectral image or the current hyperspectral image. Accordingly, it is possible to prevent a hyperspectral image of an overlapping region from being reflected in the full hyperspectral image.

Figure 15:
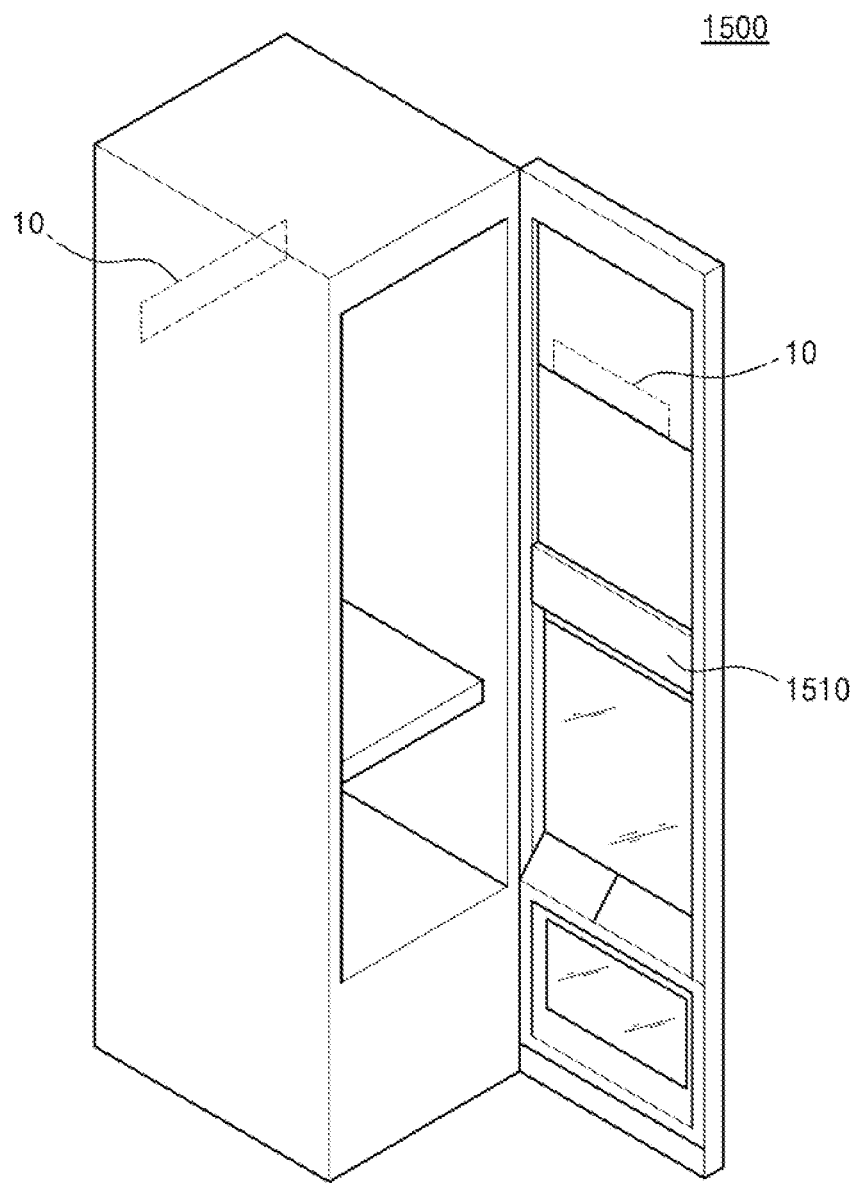
FIGS. 15 to 16 are reference views illustrating a hyperspectral image sensor in a clothing management apparatus.
Figure 16:
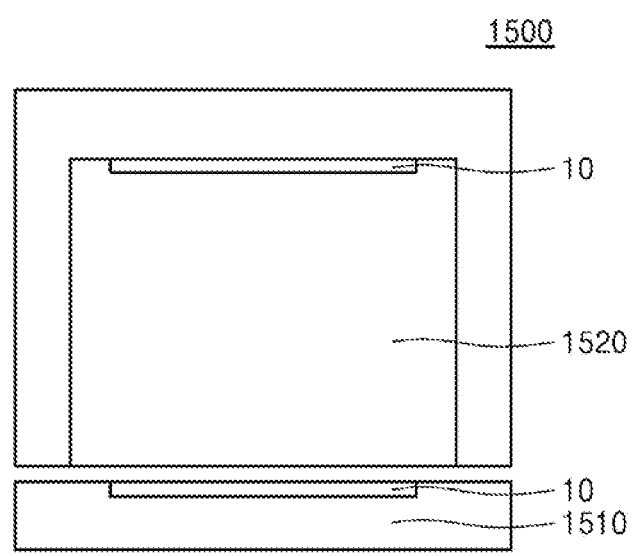

FIGS. 15 and 16 are reference views illustrating a hyperspectral image sensor in a clothing management apparatus.

Referring to FIGS. 15 and 16, the hyperspectral image sensor 10 may be on a clothing management apparatus 1500.

The clothing management apparatus 1500 may be implemented by an electronic device for removing odor, dust, or wrinkles of the clothing contained in the interior by using a method of spraying air or steam.

The clothing management apparatus 1500 may have a clothing management chamber 1520 therein. An opening is formed on a front surface of a main body, and a door 1510 is rotatably coupled to the main body to be opened and closed. The door 1510 may be installed to open and close the clothing management chamber 1520. The door 1510 may be coupled to the main body by a connection member such as a hinge.

The clothing management chamber 1520 may form a space in which clothing is accommodated. The clothing management chamber 1520 may include a supporting member to support the clothing accommodated therein.

The hyperspectral image sensor 10 may be on at least one of an inner surface of the door 1510 and an inner surface of the clothing management chamber 1520. The hyperspectral image sensor 10 may be adjacent to the clothing when the door 1510 is closed. The hyperspectral image sensor 10 may be adjacent to clothing when the clothing is accommodated in the clothing management chamber 1520 regardless of opening and closing of the door 1510.

The hyperspectral image sensor 10 of the disclosure may accurately sense the clothing in a position where field of view (FOV) is not fully secured.

When the door 1510 is closed and a user input is received, the hyperspectral image sensor 10 may scan the clothing.

The clothing management apparatus 1500 may analyze a material of the clothing under a preset condition. For example, the preset condition may include a scanning length. The clothing management apparatus 1500 may select an operation mode according to a clothing material. Strength of steam, a degree of heat, a degree of dehumidification, an output of a clothing support, and so on may be changed depending on the operation mode.

Figure 17:
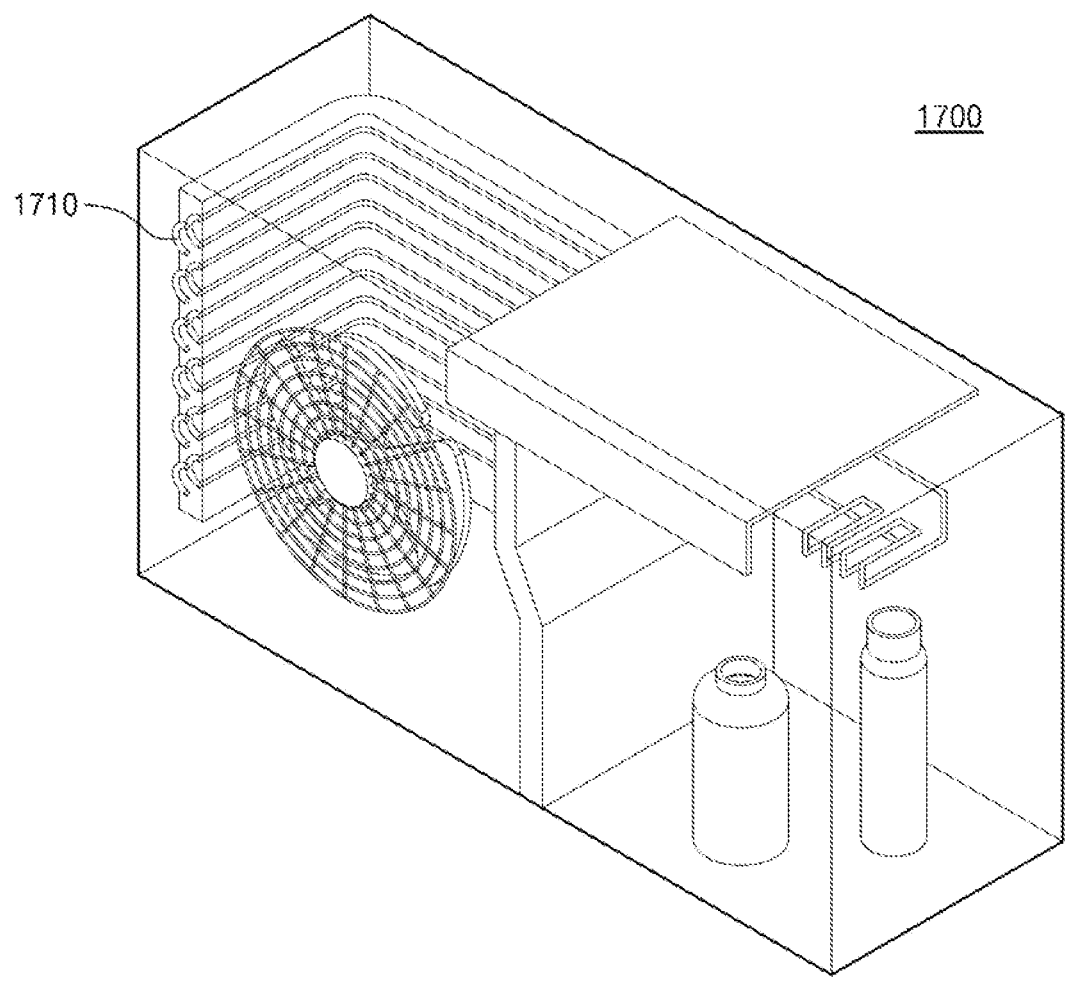
FIGS. 17 and 18 are reference views illustrating a hyperspectral image sensor in an outdoor unit.
Figure 18:
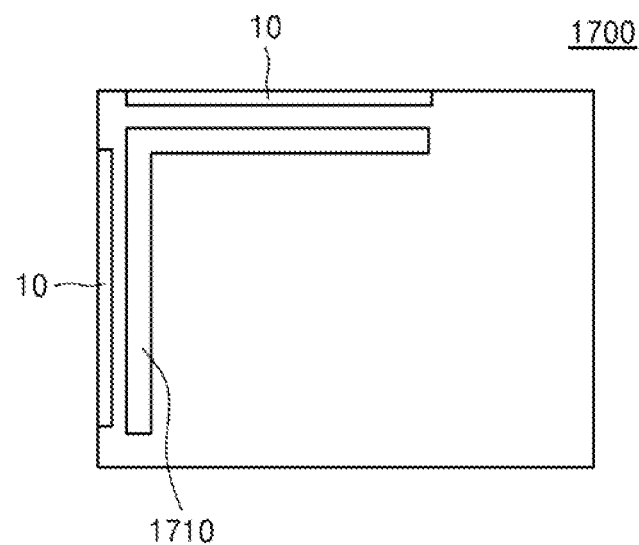

FIGS. 17 and 18 are reference views illustrating a hyperspectral image sensor in an outdoor unit.

Referring to FIGS. 17 and 18, the hyperspectral image sensor 10 may be on an outdoor unit 1700.

An outdoor unit 1700 may include a heat exchanger 1710 for exchanging heat with external air. The outdoor unit 1700 is placed in an outdoor, and thus, a pollution source may be easily attached to the heat exchanger 1710 due to moisture. For example, the pollution source may indicate fungi but is not limited thereto. The hyperspectral image sensor 10 may be adjacent to the heat exchanger 1710 to sense the pollution source. The hyperspectral image sensor 10 of the disclosure may accurately sense the pollution source in a position where field of view (FOV) is not fully secured.

When a user input is received and reaches a preset scan cycle, the outdoor unit 1700 may scan the pollution source attached to the heat exchanger 1710.

The outdoor unit 1700 may scan the pollution source attached to the heat exchanger 1710 under a preset condition. For example, the preset condition may include a scanning length. When it is determined that there is a pollution source, the outdoor unit 1700 may display presence of the pollution source on a display of an indoor unit.

The outdoor unit 1700 may determine cleaning time of the outdoor unit 1700 according to the amount of pollution source and may remove the pollution source based on the cleaning time. For example, the outdoor unit 1700 may remove a pollution source by driving a blowing fan.

In addition, the embodiments described above may be implemented by a program that may be executed by a computer and may be implemented by a general-purpose digital computer that executes the program by using a computer-readable recording medium. In addition, the data used in the embodiments described above may be recorded on a computer-readable recording medium through various devices. The computer-readable recording medium may include a storage medium such as a magnetic storage medium (for example, a read only memory (ROM), a floppy disk, a hard disk, or so on) or an optical reading medium (for example, a compact disk (CD)-ROM, a digital video disk (DVD), or so on).

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. A hyperspectral image sensor comprising:
   an optical irradiator configured to irradiate light to a partial region of an object;
   an optical path adjustment element configured to adjust a path of detection light generated in a plurality of different sub-regions included in the partial region in response to the irradiated light;
   an optical detector configured to receive the detection light from the optical path adjustment element and generate a plurality of spectrum signals, each of the plurality of spectrum signals corresponding to a respective sub-region of the plurality of different sub-regions included in the partial region; and
   a processor configured to generate a hyperspectral image of the partial region based on the plurality of spectrum signals,
   wherein the optical irradiator comprises a first light source array including a plurality of first light sources arranged in a first direction, a second light source array including a plurality of second light sources arranged in the first direction and being separated from the first light source array and a transmissive window extending in the first direction and disposed between the first light source array and the second light source array, the first light source array being arranged in parallel to the second light source array,
   wherein the optical path adjustment element is arranged to receive the detection light from the plurality of different sub-regions in a third direction through the transmissive window and adjust the path of the detection light so that the detection light is transmitted toward the optical detector in a second direction perpendicular to the first direction, the third direction being perpendicular to each of the first direction and the second direction, wherein the optical detector comprises:
a lens configured to receive the detection light generated in the plurality of different sub-regions included in the partial region,
a spectrum filter configured to output a plurality of sub-spectrum filter signals for each sub-region of the plurality of different sub-regions based on the detection light, the plurality of sub-spectrum filter signals corresponding to a plurality of different wavelength bands for each sub-region of the plurality of different sub-regions, and
a spectrum signal generator configured to generate a plurality of sub-spectrum signals for each sub-region of the plurality of different sub-regions based on the plurality of sub-spectrum filter signals.

2. The hyperspectral image sensor of claim 1, wherein the processor is further configured to generate a plurality of sub-hyperspectral images based on the plurality of sub-spectrum signals, each of the plurality of sub-hyperspectral images corresponding to a respective sub-region of the plurality of different sub-regions, and
wherein the processor is further configured to merge the plurality of sub-hyperspectral images with each other to generate the hyperspectral image of the partial region.

3. The hyperspectral image sensor of claim 1, wherein, for each of the plurality of different sub-regions, the spectrum filter outputs at least three sub-spectrum filter signals, the at least three sub-spectrum filter signals respectively corresponding to the different wavelength bands.

4. The hyperspectral image sensor of claim 1, wherein the spectrum filter is further configured to transmit the plurality of sub-spectrum filter signals to the spectrum signal generator through a plurality of channels.

5. The hyperspectral image sensor of claim 1, wherein the optical irradiator is arranged at a preset distance from the object.

6. The hyperspectral image sensor of claim 1,
wherein each of the first light source array and the second light source array is configured to emit a plurality of inspection lights toward the partial region.

7. The hyperspectral image sensor of claim 6, wherein each of the first light source array and the second light source array is further configured to simultaneously emit the plurality of inspection lights toward the partial region.

8. The hyperspectral image sensor of claim 1, wherein the transmissive window is formed in an opening of the optical irradiator.

9. The hyperspectral image sensor of claim 1, wherein the optical irradiator is further configured to emit light toward a second partial region of the object, different from the partial region, after emitting the light to the partial region and moving to a position facing the second partial region in a second direction perpendicular to the first direction.

10. The hyperspectral image sensor of claim 9, wherein the processor is further configured to generate a full hyperspectral image of the object based on the hyperspectral image generated in the partial region and a second hyperspectral image generated in the second partial region.

11. The hyperspectral image sensor of claim 1, wherein the optical irradiator is further configured to emit light toward a second partial region of the object, the second partial region at least partially overlapping the partial region.

12. The hyperspectral image sensor of claim 11, wherein the processor is further configured to generate a full hyperspectral image of the object by removing an overlapping hyperspectral image of an overlapping region in which the second partial region at least partially overlaps the partial region.

13. An operating method of a hyperspectral image sensor including an optical irradiator, an optical path adjustment element, an optical detector and a processor, the operating method comprising:
irradiating light to a partial region of an object by the optical irradiator;
adjusting, by the optical path adjustment element, a path of detection light generated in a plurality of different sub-regions included in the partial region in response to the irradiated light;
receiving, by the optical detector, the detection light transmitted from the optical path adjustment element;
generating, by the optical detector, a plurality of spectrum signals, each of the plurality of spectrum signals corresponding to a respective sub-region of the plurality of different sub-regions included in the partial region; and
generating, by the processor, a hyperspectral image of the partial region based on the plurality of spectrum signals,
wherein the optical irradiator comprises a first light source array including a plurality of first light sources arranged in a first direction, a second light source array including a plurality of second light sources arranged in the first direction and being separated from the first light source array and a transmissive window extending in the first direction and disposed between the first light source array and the second light source array, the first light source array being arranged in parallel to the second light source array,
wherein the adjusting the detection light comprises receiving the detection light from the plurality of different sub-regions in a third direction through the transmissive window and adjusting the path of the detection light so that the detection light is transmitted toward the optical detector in a second direction perpendicular to the first direction, the third direction being perpendicular to each of the first direction and the second direction,
wherein the optical detector comprises a lens, a spectrum filter and a spectrum signal generator,
wherein the receiving of the detection light comprises receiving, by the lens, the detection light generated in the plurality of different sub-regions included in the partial region,
wherein the generating of the plurality of spectrum signals comprises:
outputting, by the spectrum filter, a plurality of sub-spectrum filter signals for each sub-region of the plurality of different sub-regions based on the detection light, the plurality of sub-spectrum filter signals corresponding to a plurality of different wavelength bands for each sub-region of the plurality of different sub-regions, and
generating, by the spectrum signal generator, the plurality of spectrum signals for each sub-region of the plurality of different sub-regions based on the plurality of sub-spectrum filter signals.

14. The operating method of claim 13, wherein, in the irradiating of the light, a plurality of inspection lights are simultaneously irradiated to the partial region.

15. The operating method of claim 13, wherein the generating of the hyperspectral image comprises:
generating a plurality of sub-hyperspectral images based on the plurality of sub-spectrum filter signals, each of the plurality of sub-hyperspectral images corresponding to a respective sub-region of the plurality of different sub-regions; and
merging the plurality of sub-hyperspectral images with each other to generate the hyperspectral image of the partial region.

16. The operating method of claim 13, further comprising:
irradiating, by the optical irradiator, light to a second partial region of the object different from the partial region; and
generating, by the processor, a full hyperspectral image of the object based on the hyperspectral image generated in the partial region and a second hyperspectral image generated in the second partial region.

17. The operating method of claim 13, further comprising:
irradiating, by the optical irradiator, light to a second partial region of the object, the second partial region at least partially overlapping the partial region; and
generating, by the processor, a full hyperspectral image of the object by removing an overlapping hyperspectral image of an overlapping region in which the second partial region at least partially overlaps the partial region.

18. The hyperspectral image sensor of claim 1, wherein the plurality of different sub-regions include a first sub-region, a second sub-region adjacent to the first sub-region and a third sub-region adjacent to the second sub-region,
wherein the spectrum filter is further configured to output a plurality of first sub-spectrum filter signals for the first sub-region, a plurality of second sub-spectrum filter signals for the second sub-region and a plurality of third sub-spectrum filter signals for the third sub-region, and
wherein the spectrum signal generator is further configured to generate a plurality of first sub-spectrum signals for the first sub-region based on the plurality of first sub-spectrum filter signals, a plurality of second sub-spectrum signals for the second sub-region based on the plurality of second sub-spectrum filter signals, and a plurality of third sub-spectrum signals for the third sub-region based on the plurality of third sub-spectrum filter signals.

19. The operating method of claim 13, wherein the plurality of different sub-regions include a first sub-region, a second sub-region adjacent to the first sub-region and a third sub-region adjacent to the second sub-region,
wherein the outputting of the plurality of sub-spectrum filter signals comprises outputting a plurality of first sub-spectrum filter signals for the first sub-region, a plurality of second sub-spectrum filter signals for the second sub-region and a plurality of third sub-spectrum filter signals for the third sub-region, and
wherein the generating of the plurality of spectrum signals comprises generating a plurality of first sub-spectrum signals for the first sub-region based on the plurality of first sub-spectrum filter signals, a plurality of second sub-spectrum signals for the second sub-region based on the plurality of second sub-spectrum filter signals, and a plurality of third sub-spectrum signals for the third sub-region based on the plurality of third sub-spectrum filter signals.

\* \* \* \* \*